Patented Feb. 7, 1939

2,145,898

UNITED STATES PATENT OFFICE 2,145,898

ADHESIVE COATING FOR FILTERS

Donald C. Simpson, Newark, Ohio, assignor, by mesne assignments, to Owens-Corning Fiberglas Corporation, a corporation of Delaware No Drawing. Application September 21, 1935, Serial No. 41,627

9 Claims. (Cl. 252—2.5)

My invention relates to adhesive substances or compounds adapted for coating filter bases. The invention is particularly adapted for use with impingement types of air or gas filters which consist essentially of means for breaking the flow of air or other gas into fine streams. The air or gas is thereby brought into intimate contact with suitably coated surfaces, the coating usually comprising a viscous substance. The dust or foreign particles in the air or gas impinge upon these surfaces and adhere thereto. Matted glass fibers or glass wool may be noted as an example of a filter base of the impingement type.

Ordinary oils have long been used as a surface coating for such filter bases, but such use presents definite disadvantages or objections. The oil must have sufficient fluidity to permit effective capillary action so that the oil will penetrate and wet the accumulating layers of dust or foreign particles as they are deposited, in such manner that the accumulating particles will adhere to the filter. It has thus been found necessary to use oils or materials having very low viscosity. The method in general use for treating the filter bases with such oil in the manufacture of air or gas filters, consists in dipping the material to be coated into a bath of the oil and then draining it. The oil continues to drip from the material for an indefinite period of time and often throughout the entire life of the filter, the dripping being especially pronounced at higher temperatures. This is obviously an objectionable feature. It necessitates the use of pans or other contrivances to catch the drip while the filter is in use, and is otherwise undesirable.

An object of my invention is to provide a viscous coating material for filter bases which is free from the above-noted objections and which will maintain a practically constant viscosity throughout the rather wide temperature range within which air filters are ordinarily used.

Other objects of the invention will appear hereinafter.

The present application includes certain subject-matter disclosed in my copending application Serial Number 644,814, filed November 29, 1932, now Patent No. 2,068,202 dated January 19, 1937, Manufacture of glass wool, and is a continuation of said application as to all subject-matter common to both said applications.

A coating material for filters which I have used with satisfactory results as a coating for filter bases consisting of glass wool and the like, comprises a heavy oil refined to a point where it is free from odor and contains about 25% of wax. This product has a low cold test so that it remains liquid or viscous at a low temperature. It is sufficiently liquid or viscous to effectively catch and retain the dust from the air at a temperature as low as 20° F. below zero. It can also be raised to a temperature of 125° F. or higher without becoming sufficiently liquid to run or drip. This adhesive material may be applied to the glass wool or other filter base by an ordinary spraying operation and preferably while the materials are hot or warm, as more fully set forth in my copending application hereinbefore referred to.

A novel and improved type of adhesive coating material or compound which I have discovered, comprises a low viscosity oil combined with suitable stiffening materials of water soluble soap, such as the alkali soaps, in such a manner that its viscosity remains practically constant throughout a wide temperature range. This temperature may range from zero F. to about 200° F.

One example of such compound consists in the combination of a sodium soap with a light mineral oil. This compound or mixture is formed by mixing the soap with water to form an emulsion, adding the oil to the emulsion and boiling it until the water is driven off. The boiling may be done in an ordinary oil refining kettle or other container. This leaves a mixture of the soap and oil which is of uniform consistency and free from clots or chunks of the soapy material. I have found that by the manufacturing method just described and the use of proper proportions of soap and water, an adhesive material is developed which will remain in a solid condition or state in which it will not drip, throughout said temperature range from zero F. to 200° F. At the same time the oil is retained in the adhesive in such form that its capillarity is not materially reduced and it is, therefore, operative to wet the accumulating layers of dust in a manner similar to that of ordinary oils.

Specific examples of sodium soaps which I have found to give very satisfactory results in commercial use in making an adhesive coating material such as just described, are sodium stearate $NaC_{18}H_{35}O_2$, and sodium oleate $NaC_{18}H_{33}O_2$. In the use of sodium stearate, the following formula may be employed:

| | Pounds |
|---|---|
| Sodium stearate $NaC_{18}H_{35}O_2$ | 14 |
| Steam cylinder oil | 86 |
| Water | 100 |

The preferred method of combining these ingredients is to add the sodium stearate to the water to form an emulsion. The steam cylinder oil is then added to the emulsion and the mixture heated to 400° F. and held at this temperature until the water is all driven off.

Modifications may be resorted to within the spirit and scope of my invention.

I claim:

1. An air filtering material comprising a fibrous refractory material and an oily substance forming a coating for the fibers of said material, said substance consisting of a mixture of oil, water soluble alkali soap, and wax having such properties and in such proportions that it will not run at a temperature of 100° F. and will remain viscous at temperatures below zero F.

2. An air filter comprising a filter base and an adhesive compound forming a coating for the filter base, said compound comprising a sodium soap and an oil compounded therewith, said oil and soap being of such nature and proportions and so compounded that the adhesive will not change materially in viscosity over a temperature range of from zero F. to 200° F.

3. An air filter comprising a filter base and a viscous coating material for coating the said filter base, said coating comprising a compound of sodium soap and a light mineral oil.

4. An air filter comprising a filter base and a filter adhesive coating therefor comprising sodium soap in combination with an oil having a substantially constant viscosity over a temperature range of from zero F. to 200° F.

5. An air filter comprising a mat of glass wool fibers, and a coating for the surfaces of said fibers, said coating comprising a mixture of an oil and a soluble soap.

6. An air filter comprising a mat of glass wool fibers, and a coating for the surfaces of said fibers, said coating comprising a mixture of an oil and sodium soap.

7. In an air filter, a porous filter base and an adhesive coating therefor comprising a mixture of oil and a water soluble alkali soap.

8. An air filter comprising a porous filter base and a viscous coating therefor, said coating comprising a compound of sodium soap and a light mineral oil, said coating having such characteristics that the oil will penetrate and wet through the layers of dust as they accumulate on the coating, and which coating will not drip or run at atmospheric temperatures.

9. An air filter comprising a porous filter base and an adhesive coating therefor comprising a compound of sodium stearate and oil.

DONALD C. SIMPSON.